(12) United States Patent
Reagan et al.

(10) Patent No.: US 8,478,272 B2
(45) Date of Patent: Jul. 2, 2013

(54) SYSTEMS AND METHODS FOR REAL TIME ALLOCATION OF BANDWIDTH AT A FEMTOCELL

(75) Inventors: Robert Reagan, Milpitas, CA (US); Richard Kerr, Milpitas, CA (US)

(73) Assignee: Public Wireless, Inc., San Jose, CA (US)

( * ) Notice: Subject to any disclaimer, the term of this patent is extended or adjusted under 35 U.S.C. 154(b) by 0 days.

(21) Appl. No.: 13/275,615

(22) Filed: Oct. 18, 2011

(65) Prior Publication Data

US 2012/0178452 A1    Jul. 12, 2012

Related U.S. Application Data

(60) Provisional application No. 61/394,029, filed on Oct. 18, 2010.

(51) Int. Cl.
*H04W 36/00* (2009.01)
(52) U.S. Cl.
USPC ........... 455/436; 455/405; 455/406; 370/328; 370/338
(58) Field of Classification Search
USPC .................. 370/328, 338; 455/405, 406, 436
See application file for complete search history.

(56) References Cited

U.S. PATENT DOCUMENTS

| | | | |
|---|---|---|---|
| 2002/0068546 A1* | 6/2002 | Plush et al. | 455/406 |
| 2003/0120583 A1 | 6/2003 | Olson et al. | |
| 2004/0029575 A1 | 2/2004 | Mehta | |
| 2006/0058007 A1* | 3/2006 | Choksi | 455/406 |
| 2007/0087735 A1* | 4/2007 | March et al. | 455/418 |
| 2009/0092075 A1* | 4/2009 | Corson et al. | 370/328 |
| 2009/0131014 A1* | 5/2009 | Mashinsky et al. | 455/405 |
| 2009/0170444 A1 | 7/2009 | Retnasothie et al. | |
| 2011/0026503 A1* | 2/2011 | Mueck et al. | 370/338 |
| 2011/0103301 A1* | 5/2011 | Mueck et al. | 370/328 |

OTHER PUBLICATIONS

International Search Report and Written Opinion issued on May 9, 2012, in corresponding application No. PCT/US2011/056745, 9 pages.

* cited by examiner

*Primary Examiner* — Lester Kincaid
*Assistant Examiner* — Isaak R Jama
(74) *Attorney, Agent, or Firm* — Procopio, Cory, Hargreaves & Savitch LLP

(57) ABSTRACT

Systems and methods for real time allocation of radio devices in a femtocell that includes a plurality of software-defined radios (SDRs) are provided. The SDRs can be reconfigured in real time based on the changing network conditions and/or changes to contractual obligations of the femtocell provider. The femtocell can be reconfigured in real time either remotely from a network operations center (NOC) or the femtocell can be configured to automatically detect changing usage patterns and to automatically reconfigure the SDRs. The femtocell can also be configured to receive emergency override signals from the NOC to cause the femtocell to reconfigure one or more of the SDRs for use by emergency responders.

24 Claims, 5 Drawing Sheets

SYSTEMS AND METHODS FOR REAL TIME ALLOCATION OF BANDWIDTH AT A FEMTOCELL

PRIORITY CLAIM

This application claims priority to U.S. Provisional Patent Application No. 61/394,029, filed on Oct. 18, 2010, titled "Systems and Methods for Real Time Allocation of Bandwidth at a Femtocell," the entirety of which is hereby incorporated herein by reference.

FIELD OF THE INVENTION

The present invention generally relates to the field of wireless communication systems and to systems and methods for allocating bandwidth at a femtocell.

SUMMARY

In one embodiment a configurable base station is provided. The base station comprises a plurality of radio devices, each of which establish a wireless connection between the base station and a plurality of user devices; a network interface that sends data to a network and receives data from the network; at least one processor; and at least one executable software module. The at least one executable software modules is executed by the at least one processor to reconfigure one or more of the plurality of radio devices to be assigned to a first carrier, wherein the reconfigured one or more radio devices were not assigned to the first carrier before their reconfiguration.

In another embodiment, a method of operating a base station is provided. The base station comprises a processor and a plurality of radio devices. The method comprises, by the processor, detecting a connection request from a user device; identifying a carrier associated with the user device; determining whether the associated carrier has subscribed for coverage from the base station; and, if it is determined that the associated carrier has subscribed for coverage from the base station, determining whether there is an available contracted one of the plurality of radio devices, if it is determined that there is an available contracted one of the plurality of radio devices, establishing a connection between the user device and the available contracted radio device, and, if it is determined that there is not an available contracted one of the plurality of radio devices, determining whether the associated carrier has overage coverage, and, if it is determined that the associated carrier has overage coverage, reconfiguring one of the plurality of radio devices to use a frequency or protocol which is different than it was using prior to reconfiguration and establishing a connection between the user device and the reconfigured radio device.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
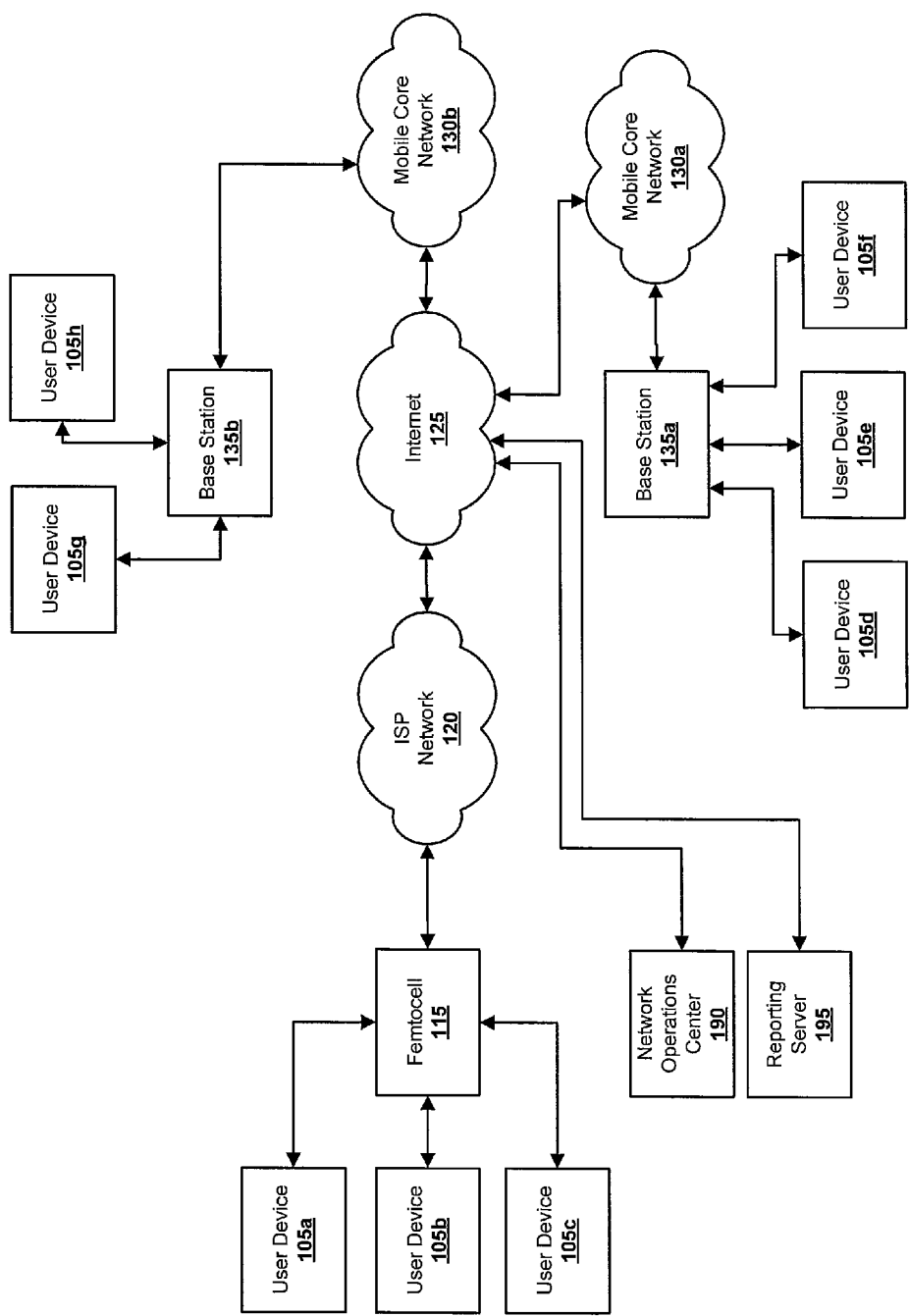
FIG. 1 illustrates an example of a femtocell deployed in a wireless communications network in which the system and methods disclosed herein can be implemented according to an embodiment.

Systems and methods for real time allocation of radio devices in a femtocell that includes a plurality of software-defined radios (SDRs) and/or other types of radio devices are provided. In an embodiment, the SDRs can be reconfigured in real time based on the changing network conditions and/or changes to contractual obligations of the femtocell provider. The femtocell can be part of a network of one or more femtocells, picocells, and/or other base stations that can provide wireless network coverage to mobile devices, such as mobile phones, laptop or touchpad computers, and other devices that can connect to wireless networks for transmitting and/or receiving voice and/or data. The femtocell provider can contract with mobile phone network providers (referred to herein as "carriers") to provide wireless network connectivity to the carriers' subscribers. The femtocells can be used to fill in gaps in coverage in a carrier's network(s) or to add extra capacity at points in a network where high subscriber traffic may be present, such as airports, train stations, sports or concert venues.

The femtocell can include a plurality of SDRs that can be configured based on the current needs of the contracted carriers without requiring that a technician be deployed in the field to service the femtocell in order to change the configuration of the device. The femtocell can include "excess" SDRs beyond the number of SDRs required to service the currently contracted carriers or projected contracted carriers. For example, the femtocell may require five SDRs to satisfy the requirements of the currently contracted carriers, but ten SDRs can be incorporated into the femtocell to provide for changing traffic patterns and changing contractual agreements with carriers. As the traffic patterns or contractual agreements change, a technician may not need to be deployed to the field to reconfigure the radio devices of the femtocell to meet these changing needs. Instead, in some embodiment the device can be reconfigured by sending reconfiguration commands from a remote network operations center (NOC) that can monitor the functionality of a plurality of femtocells deployed in the field, and in some embodiments, the femtocell itself can be configured to monitor changing traffic.

In one embodiment, the femtocell can be configured to provide wireless network access to subscribers of one or more wireless carriers. A wireless carrier can contract with the provider of the femtocell to provide coverage for that carrier's subscribers. As a result, one or more SDRs included in the femtocell can be configured to operate using the frequency or frequencies and wireless protocols used by the contracting carrier. The femtocell can be configured to continually monitor usage by subscribers associated with the contracting carriers, and can reconfigure the SDRs allocated to a first contracted carrier in order to satisfy peak needs for a second contracted carrier in the event that the femtocell does not identify any user devices associated with the first contracted carrier within the coverage area of the femtocell. The femtocell can also take into consideration subscriber activity within the coverage areas of adjacent base stations when determining whether to reconfigure one or more SDRs to handle the peak demands of the second contacted carrier. If a handoff to the femtocell is imminent, the femtocell can reserve at least one SDR to handle the traffic for the first contracted party, and reconfigure other SDRs to handle the traffic for the second contracted party.

In another embodiment, the femtocell can be configured to include one or more "excess" SDRs in addition to the SDRs than are anticipated to be needed to provide coverage for contracted carriers at the time the femtocell is assembled. The "excess" SDRs can be held in reserve and be configured for use with a contracted carrier if a contracted carrier reaches a peak capacity condition where the SDRs allocated to that carrier cannot handle any additional traffic. To remedy this situation, the femtocell provider can offer an "overdraft" protection service to contracted carriers where one or more of the excess SDRs can be configured to provide over capacity coverage for a contracted carrier if there are one or more SDRs that are available to handle the excess capacity. This allows the femtocell to adapt to the changing capacity needs of one or more contract carriers in real time, enabling the carriers to provide a better user experience for the carriers' subscribers without requiring that the carriers contract for an additional SDR all the time.

In yet another embodiment, the femtocell can be configured to configure the "excess" SDRs for use by a public safety official in the event of an emergency. In some embodiments, the femtocell can be configured to reprogram all of the SDRs in the device for use by an emergency service in the event of an extreme emergency.

FIG. 1 illustrates an example of a typical femtocell deployed in a wireless communications network. Although various embodiments are described herein with reference to femtocells, the teachings disclosed herein can also be applied to picocells, access points, and more generally to base stations. Femtocell 115, can be, for example a small base station that can be deployed in a residential or enterprise environment to provide wireless network access to one or more user devices 105. The femtocell 115 can be configured to provide coverage for one or more mobile phone carriers/network providers. Femtocell 115 can be configured to communicate with the mobile core networks 130 (e.g., radio access network (RAN) core networks) of the mobile carriers via a broadband connection provided, for example, by an Internet Service Provider (ISP) network 120. Core networks 130 provide telecom services to the user devices 105 that are subscribers of the respective carrier associated with each core network 130. User devices 105 can be mobile communication devices, such as a mobile phones or wireless modems, or other device configured to use voice and/or data communications services of the core networks 130. According to an embodiment, the femtocell 115 can be configured to provide wireless coverage for emergency services, which may have different frequencies, communications protocols, and/or core network services than those used by the wireless carriers.

Femtocell 115 can receive the data from a core network 130 via the ISP network 120 and transmit the data to the one or more user devices 105. Femtocell 115 can also receive voice and/or data packets from the user devices 105. The user devices can include any device which can communicate over a wireless connection, such as mobile telephones, smart phones, tablets, other portable computing devices, and the like.

As described above, femtocell 115 can be contracted with one or more mobile network providers to provide coverage for user devices 105 associated with those carriers. At least some of the user devices 105 that enter the coverage area of the femtocell 115 can be associated with other carriers and can be configured to communicate using one or more different frequencies than the femtocell 115 is configured to use when communicating with the user device 105 associated with the carriers with which the femtocell 115 is contracted to provide coverage.

The coverage area of femtocell 115 can also overlap the coverage areas of one or more base stations 135. The base stations 135 are in communication with the core network 130 and provide coverage to user devices 105. According to some embodiments, the femtocell 115 can adjust its output power to avoid interfering with the base stations 135.

Network operations center (NOC) 190 can comprise one or more computing centers for managing the operation of the femtocell 115 in the field. In some embodiments, the NOC 190 can manage the operation of an entire network of femtocells installed across a wide geographical area. In yet other embodiments, the network can comprise a mix of different types of base stations, such as picocells and femtocells.

The NOC 190 allows administrators to remotely monitor the operation of femtocell 115 and any other base stations on the network. According to an embodiment, a system administrator or technician can also remotely configure the femtocell 115 in the event that a problem is identified that can be corrected by reconfiguring the femtocell 115. If a problem is identified at the femtocell 115, a system administrator can schedule a service technician to visit the femtocell 115 in the field and preorder the replacement components needed to correct the problem before the technician is dispatched. In some embodiments, in order to decrease service costs and the number and length of visits to femtocell deployed in the field, a replacement femtocell matching the requirements of a malfunctioning femtocell can be ordered and shipped to the technician in advance of the technician visiting the site, and the entire femtocell can be replaced by the technician and sent back to a central service facility for refurbishment. The refurbished femtocell can then be used in a future installation. This approach can result in significant cost savings, because technicians can be trained to quickly replace the entire device in the field. Technicians do not have to spend significant amounts of time trying to diagnose a malfunctioning piece of equipment in the field, and each of the technicians deployed in the field do not require expensive diagnostic equipment and an extensive supply of spare parts.

Reporting server 195 can be configured to receive unserviced user device information collected by the femtocell 115 sent to the reporting server 195 via the ISP network 120 and/or the Internet 125. According to an embodiment, the reporting server 195 can be part of the NOC 190 or can be a separate server located at the same physical location or a different location than the NOC 190. Reporting server 195 can be configured to generate various reports using the information collected from one or more femtocells 115. In some embodiments, the reporting server 195 can be configured to generate a separate report for each mobile network provider that identifies a femtocell 115 and the number of unserviced user devices 105 that were present in the coverage area of the femtocell 115 during reporting period. The report can be used to market the services of the femtocell 115 to the mobile network providers to provide additional coverage to subscribers of the mobile network when subscribers of the mobile network enter the coverage area of the femtocell. These reports can be used to point out holes in the coverage area of the network provider where subscribers of the network provider have been detected. The reports can include information such as the number of unserviced subscribers which entered the coverage area of the femtocell 115 during the reporting period, how long the unserviced subscribers remained in the coverage area of femtocell 115, and dates and times that the unserviced subscribers were within the coverage area of femtocell 115. The reports can be used when the network provider might be interested, in contracting for coverage with the femtocell 115 by illustrating when the highest concentrations of unserviced subscribers associated with the network provider are present in the coverage area of the femtocell 115. For example, peak numbers of unserviced subscribers might have been present during commute times, during lunchtime, weekends, during special events at a nearby sports or entertainment venue, or during holidays. The provider of the femtocell 115 could then market the services of the femtocell 115 to provide spot coverage to the network provider's subscribers during the peak time periods. Alternatively, to cut costs, a carrier might contract for coverage from the femtocell whenever there is available bandwidth on the femtocell and one or more user devices belonging to that carrier's subscribers have entered the coverage area of the femtocell 115.

The femtocell 115 can be configured to determine the output power of other base stations within the coverage area of the femtocell while conducting a sweep across the broad frequency band to identify unserviced user devices. The femtocell 115 can include one or more radio devices for transmitting and/or receiving data. The femtocell 115 can adjust the output power of these radio devices in order to avoid interfering with other base stations within the coverage area of the femtocell 115.

Figure 2:
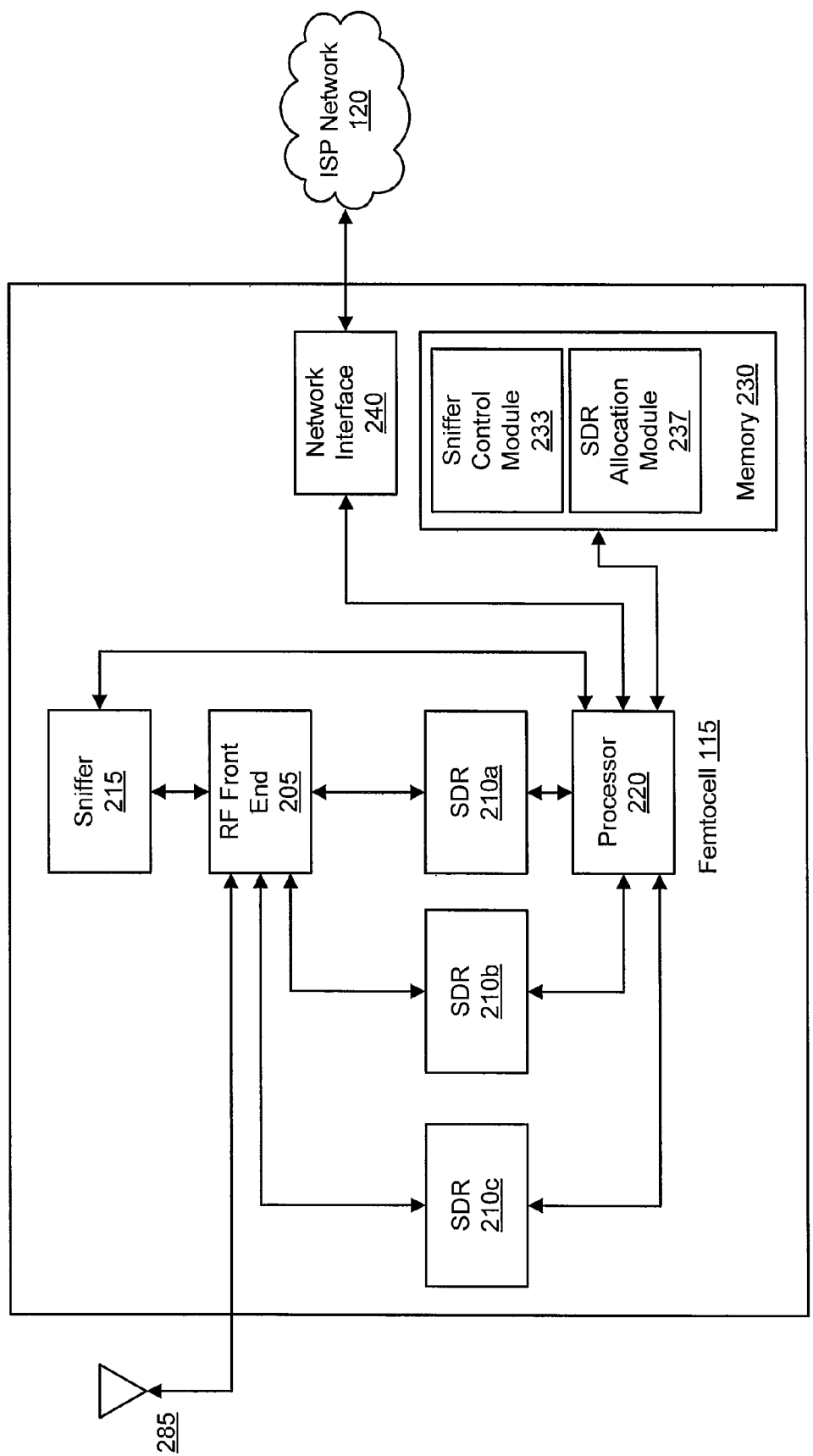
FIG. 2 is a block diagram of the logical components of a femtocell according to an embodiment.

FIG. 2 is a functional block diagram of the functional components of femtocell 115 according to an embodiment. Femtocell 115 may include one or more software-defined radios (SDRs) 210a, 210b, and 210c (collectively referred to herein as SDRs 210) for communicating wirelessly with the user devices 105. A SDR is a programmable radio device that includes a processor for executing signal processing. SDRs 210 can be configured to receive and transmit using a variety of different radio protocols (waveforms) based on the software that is executed by the processor of the SDRs 210. The SDRs 210 can be reconfigured, in real time, to change radio protocols and/or frequencies at which the SDRs 210 operate in real-time. The SDRs 210 can send data and/or voice packets received by the femtocell 115 via the ISP network 120 to the user devices 105. The SDRs 210 can also receive voice and/or data packets from the user devices 105.

Processor 220 is in communication with the SDRs 210, network interface 240, and memory 230. Memory 230 can comprise persistent and/or volatile memory. In an embodiment, memory 230 can comprise a non-transitory computer readable medium that can store executable program modules that can be executed by processor 220. For example, in an embodiment, memory 230 can include a sniffer control module 233.

The sniffer control module 233 can comprise processor executable program instructions stored in the memory 230 that when executed by processor 220 causes the processor to instruct the frequency agile sniffer 215 to conduct a sweep of a broad range of frequencies in which one or more base stations 135 and/or user devices 105 may be configured to communicate. The frequency agile sniffer 215 can identify frequencies on which one or more base stations 135 and/or user devices are transmitting at the time that the sweep is performed. The sniffer control module 233 can be configured to collect information from the sniffer 215 and store the collected information in memory 230. The sniffer control module 233 can be configured to perform at least some processing and analysis on the data collected from the sniffer 215. The sniffer control module 233 can be configured to periodically send the information to a remote reporting server 195 via the network interface 240 or to the mobile core network 130 for processing.

The sniffer 215 collects valuable information on the spectral environment to the SDRs 210. The sniffer 215 may provide the current state of what is seen (e.g., base stations) from the perspective of a user device 105 to the radio resource management and application layer aspects of one or more of the SDRs 210. The radio resource management and application layer aspects are typically located with the MAC and PHY processing, which are traditionally within in the base station, but can also be located more centrally in the network. Each SDR 210 may have its own radio resource management and application layer aspects, although many of these aspects can be a common resource across multiple SDRs 210. Data received by the sniffer 215 may be aggregated and stored. Application of predictive logic and algorithms to that data may be used to load balance on an inter-SDR level between two or more SDRs within the same base station. Additionally or alternatively, load-balancing may be performed on an intra-SDR level between two or more base stations which are within a geographic area or associated with any one or combination of mobile core networks 130. Interactions between the user device 105 and the mobile core networks 130 may occur in a fixed or nomadic state, therefore, occurring potentially on an inter-SDR level or in a mobile state whereby there may be both inter-SDR and intra-SDR interactions.

The SDR allocation module 237 can comprise processor executable program instructions that when executed can determine which of the SDRs 210 are currently in use, which of the SDRs 210 are contracted out to a specific carrier, and which carriers have contracted for "overdraft protection" to handle peak demands that exceed the contracted amount. According to an embodiment, a carrier can contract with the femtocell provider to have coverage all the time, at specific times, or when an unserviced user device from the carrier enters the coverage area of the femtocell. Unserviced user devices may include, for example, user devices which have no coverage due to capacity of contracted base station or lack of contracted base stations.

The SDR allocation module 237 can reconfigure the SDRs 210 to use specific frequencies and/or radio protocols (waveforms) associated with a particular carrier or with emergency responders. The SDR allocation module 237 can also receive configuration commands from the NOC 190 via the backhaul and to reconfigure the SDRs 210 according to those reconfiguration commands. This allows for the configuration of the femtocell 115 to be modified remotely without the associated cost and time required to send a technician out into the field to manually change the configuration of the device.

According to an additional or alternative embodiment, femtocell 115 can include a plurality of non-configurable radio devices in addition to or instead of the SDRs, and SDR allocation module 237 can be configured to switch on or off the appropriate radio device based on the current need.

The RF front end module 205 provides an interface between the SDRs 210 and the sniffer 215 and the antenna 285. Antenna 285 can comprise one or more external antennas. The RF front end module 205 can comprise power amplifiers for driving the antenna 285, low noise amplifiers (LNAs) for amplifying signals captured by antenna 285, and can implement various filters for conditioning signals received from the antenna 285 and/or from the SDRs.

The RF front end module 205 can be configured to combine and split the RF signals for embodiments where femtocell 115 includes multiple antennas 285. For example, the femtocell 115 can be configured for multiple-input and multiple-output (MIMO) or diversity usage. For example, in one embodiment, the SDRs 210 can include two receive chains supporting diversity combining The one or more antennas 285 can comprise a broadband antenna that is optimized for transmitting and/or receiving in the frequency bands that are typically used for mobile communications. Alternatively, each SDR 210 can have its own front end module 205 and antenna 285.

Network interface 240 provides an interface between a broadband connection to the ISP network 120 and the femtocell 115. The network interface 240 can send voice and/or data packets across ISP network 120 to the core networks 130 and/or to other destinations connected to the ISP network 120. The network interface can also receive voice and/or data packets from ISP network 120. The network interface 240 can also be configured to send information collected by the sniffer control module 233 to a remote server connected to ISP network 120 or to a core network 130.

Figure 3:
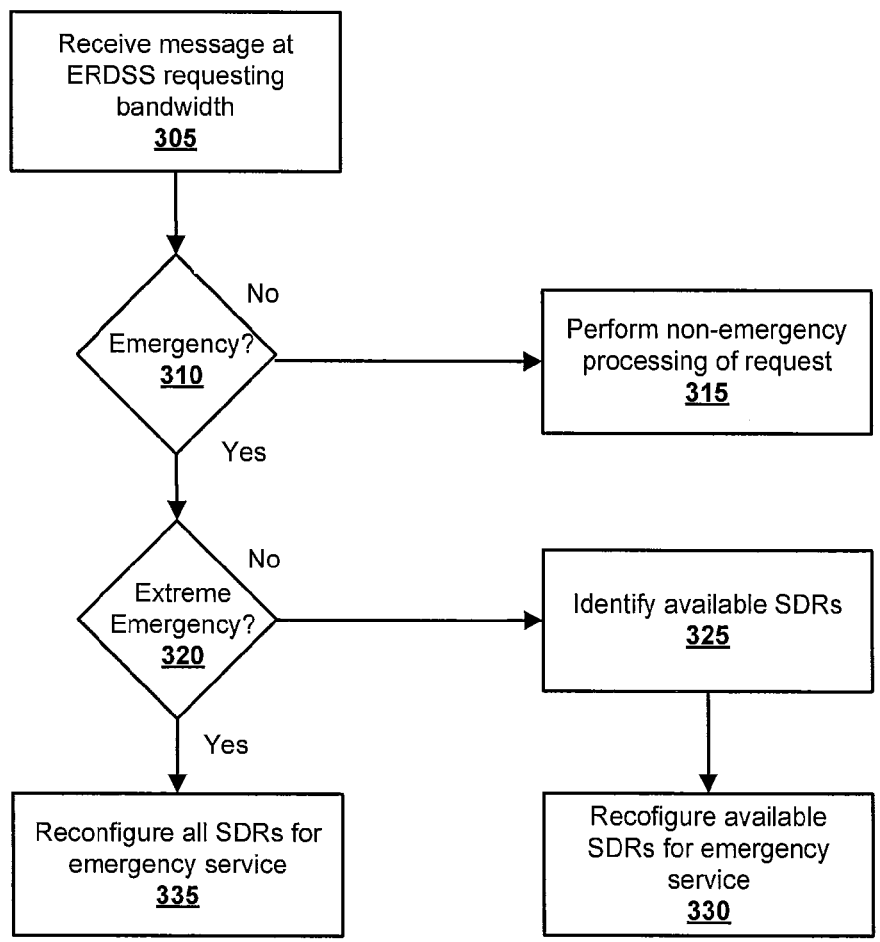
FIG. 3 is a flow diagram of a method for reconfiguring the radio devices of a femtocell in response to an emergency according to an embodiment.

FIG. 3 is a flow diagram of a method for reconfiguring the radio devices of a femtocell in response to an emergency according to an embodiment. In some embodiments, the SDRs 210 of the femtocell 115 can operate at the frequencies and/or radio protocols (waveforms) used by emergency responders, such as the military, firefighters, police, and/or in other emergency response situations. Emergency responders typically communicate using wireless communication devices, and depending upon the severity of the emergency may require a significant amount of bandwidth to coordinate rescue or other emergency response efforts. The SDR allocation module 237 of the femtocell 115 can receive an emergency override command from NOC 190 which instructs the SDR allocation module 237 to reconfigure one or more of the SDRs 210 in the femtocell 115 to provide coverage for emergency responders.

SDR allocation module 237 receives a message from the NOC 190 requesting that the SDR allocation module 237 allocate bandwidth (step 305). SDR allocation module 237 determines whether the request is for emergency services (step 310). If the request is not for emergency services, the SDR allocation module 237 processes the request for bandwidth using a non-emergency request processing method, such as the methods illustrated in FIGS. 4 and 5, which are described in detail below.

Otherwise, if the request is for emergency services, the SDR allocation module 237 determines whether the request is for an extreme emergency (step 320). If the request is not for an extreme emergency, the SDR allocation module 237 can determine which SDRs 210 are "excess" SDRs that are currently not contracted to a particular carrier. The SDR allocation module 237 then reconfigures one or more of the available SDRs 210 for use by emergency services (step 330). In this embodiment, the excess SDRs may be uncontracted SDRs that are included in the femtocell 115 to provide for future coverage agreements, for replacing faulty contracted SDRs, for providing overdraft protection at peak time, etc. According to an embodiment, contracted SDRs that are currently not being utilized due to low capacity can also be selected by the SDR allocation module 237 and reconfigured for use by the emergency services. According to an embodiment, the SDR allocation module 237 maintains the allocation of the SDRs to emergency services until a message is received from the NOC 190 instructing the SDR allocation module 237 to reset the configuration of the SDRs to the settings in place prior to the emergency.

In the event that the request for bandwidth indicates that the bandwidth request is for an extreme emergency, the SDR allocation module 237 can reconfigure all of the SDRs in the device for use by emergency services (step 335). According to an embodiment, the SDR allocation module 237 can maintain the allocation of the SDRs to emergency services until a message is received from the NOC 190 instructing the SDR allocation module 237 to reset the configuration of the SDRs to the settings in place prior to the emergency.

Figure 4:
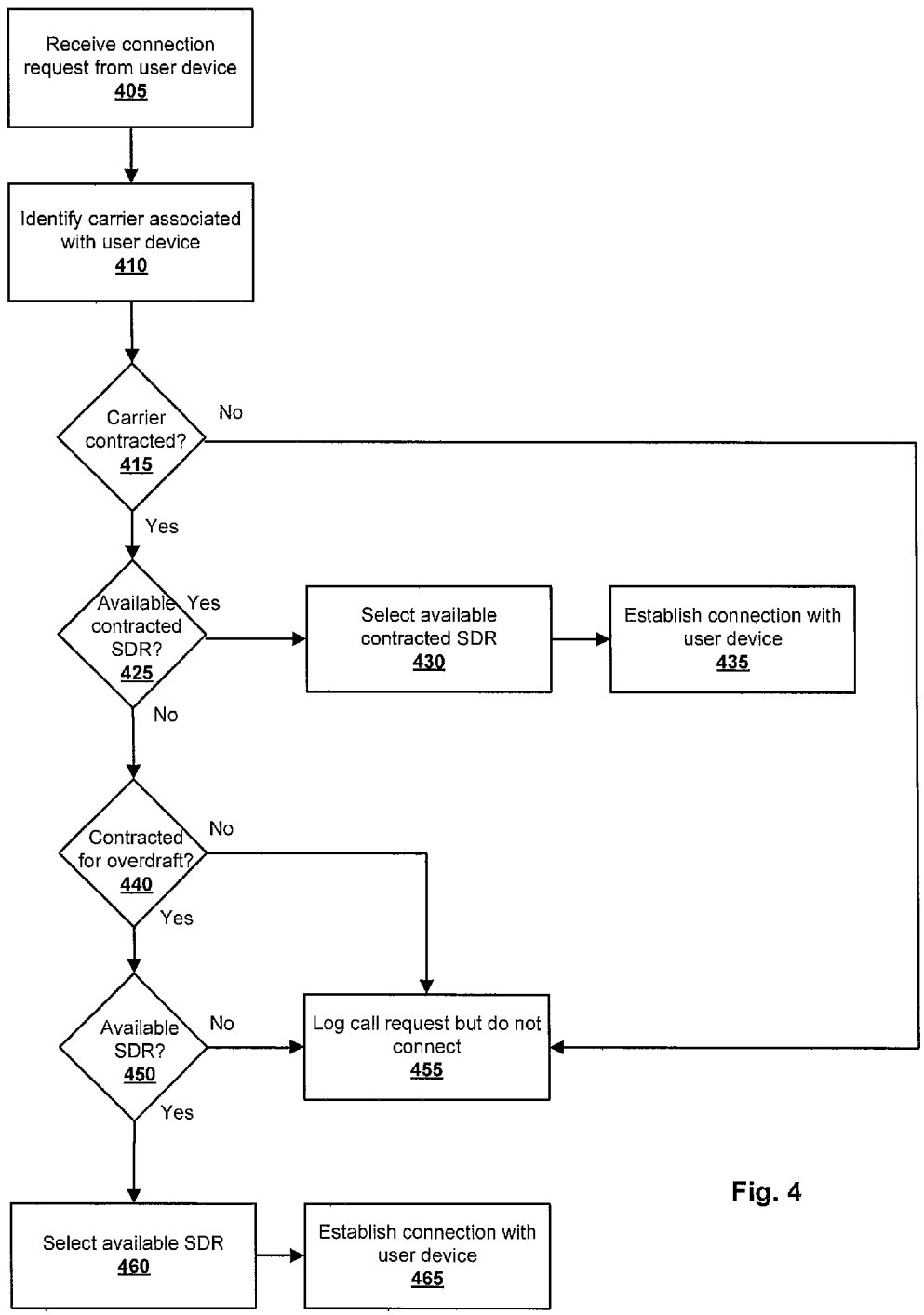
FIG. 4 is a flow diagram of a method for reconfiguring the radio devices of a femtocell to handle peak demands for connectivity according to an embodiment.

FIG. 4 is a flow diagram of a method for reconfiguring the radio devices of a femtocell to handle peak demands for connectivity according to an embodiment. For example, the femtocell 115 can provide "overdraft" coverage for subscribers of a particular carrier during peak demand periods if there is an available SDR that can be reconfigured to provide connectivity to the user devices associated with the carrier.

The femtocell 115 can detect a connection request from a user device 105 within the coverage area of the femtocell 115 (step 405) and identify the carrier associated with the user device 105 (step 410). This detection and identification can be performed by any of the SDRs 210. For instance, a radio resource management and application layer of one or more of the SDRs 210 may locally determine the specific frequency being utilized by the user device 105 and communicate with an authentication management function of the mobile core network 130. Data concerning the current state of what is seen from an entire network context can be collected and aggregated from a diverse sampling and history of user device interactions. Predictive logic and algorithms may operate on the aggregate data to perform load-balancing on an inter-SDR level between two or more SDRs 210 within the same base station. Load-balancing may also be performed on an intra-SDR level between two or more base stations which are within a geographic area or associated with any one or combination of mobile core networks 130. Interactions between the user device 105 and the mobile core networks 130 may occur in a fixed or nomadic state, therefore, occurring potentially on an inter-SDR level or in a mobile state whereby there may be both inter-SDR and intra-SDR interactions. A determination can be made whether the carrier associated with the user device has contracted for coverage with the femtocell provider (step 415). In an embodiment, the SDR allocation module 237 can be configured to keep track of which carriers have subscribed for coverage from the femtocell 115, and at which times if the carriers have not subscribed for full-time coverage. If the SDR allocation module 237 determines that the carrier associated with the user device that is requesting the connection has not contracted for coverage from the femtocell 115, the SDR allocation module 237 can log the call request in an unserviced user device log stored in the memory 230 of the femtocell and the call request can be ignored. The unserviced user device information can later be transmitted to the NOC 190 and/or Reporting Server 195 for reporting and marketing purposes. The provider of the femtocell 115 can market its services to the carrier whose unserviced user device entered the coverage area of the femtocell 115.

If the carrier of the user device has contracted for coverage from the femtocell 115, the SDR allocation module 237 can make a determination whether the carrier has a contracted SDR 210 available that can handle a connection with another user device (step 425). The SDR allocation module 237 may receive a connection request from the user device 105 on a specific frequency band. There may be an initial exchange of information from the user device 105 to an SDR 210. In turn, the SDR 210 may seek authentication locally or in a remote context tied to the authentication function of a mobile core network 130. The mobile core network 130 may respond with either an accept or reject indication. If there is acceptance, it is often tied to a function whereby the user's home network has indicated that there is a preferred list of networks on which the user device 105 has the ability to operate under pre-established business terms. The business terms govern what the home network provider pays the third party network provider for services provided to the user device 105. This is typically done with respect to incremental usage charges for user functions that may include voice minutes, messaging, and data usage. If the state of the SDR 210, as prescribed by the SDR allocation module 237, is configured to act as a third-party network element that would interact as a roaming network, then there is also the potential that, when provided with adequate information, the SDR allocation module 237 can effectively reconfigure and equip a specific SDR 210 with the ability to clone and emulate the user's home network and function in a dedicated fashion for a short or long period of time.

If the SDR allocation module 237 determines that there is at least one available contracted SDR 210 that can handle the connection to the user device 105 from which the connection request was received, the SDR allocation module 237 selects an SDR from the identified SDRs 210 (step 430) and establishes a connection with the user device 435 via the selected SDR 210 (step 435).

Otherwise, if the SDR allocation module 237 determines that there is not at least one available contracted SDR 210 that can handle the connection to the user device 105, the SDR allocation module 237 can make a determination whether the carrier associated with the requesting user device is contracted for overdraft coverage during peak utilization periods (step 440). If the carrier is not contracted for overdraft coverage during peak periods, the SDR allocation module 237 can log the details of the call request but will not establish a connection with the user device (step 455). The collected call information can be stored in an overdraft log stored in memory 230. This information can be periodically transmitted to the NOC 190 and/or Reporting Server 195 via the backhaul connection, and the femtocell provider can use this information to market the services of the femtocell 115 to the carrier who exceeded their contracted coverage amounts. The femtocell provider can use this information to encourage the carrier to contract for additional coverage during peak periods or for additional coverage overall.

Otherwise, if the carrier has contracted for overdraft coverage, the SDR allocation module 237 can make a determination whether there are currently any excess uncontracted SDRs that can be configured to handle the excess traffic for the carrier (step 450). If there are not any available excess SDRs, the SDR allocation module 237 can log the details of the call request but not establish a connection with the user device (step 455). The information collected can be sent to the NOC 190 and/or Reporting Server 195 across the backhaul connection, and the femtocell provider can use this information for marketing purposes to encourage the carrier to contract for more dedicated services.

If there is an available uncontracted SDR, the SDR allocation module 237 can select an available SDR and configure the SDR to handle excess traffic for the carrier (step 460). A connection can then be established to the user device from the selected SDR (step 465).

Figure 5:
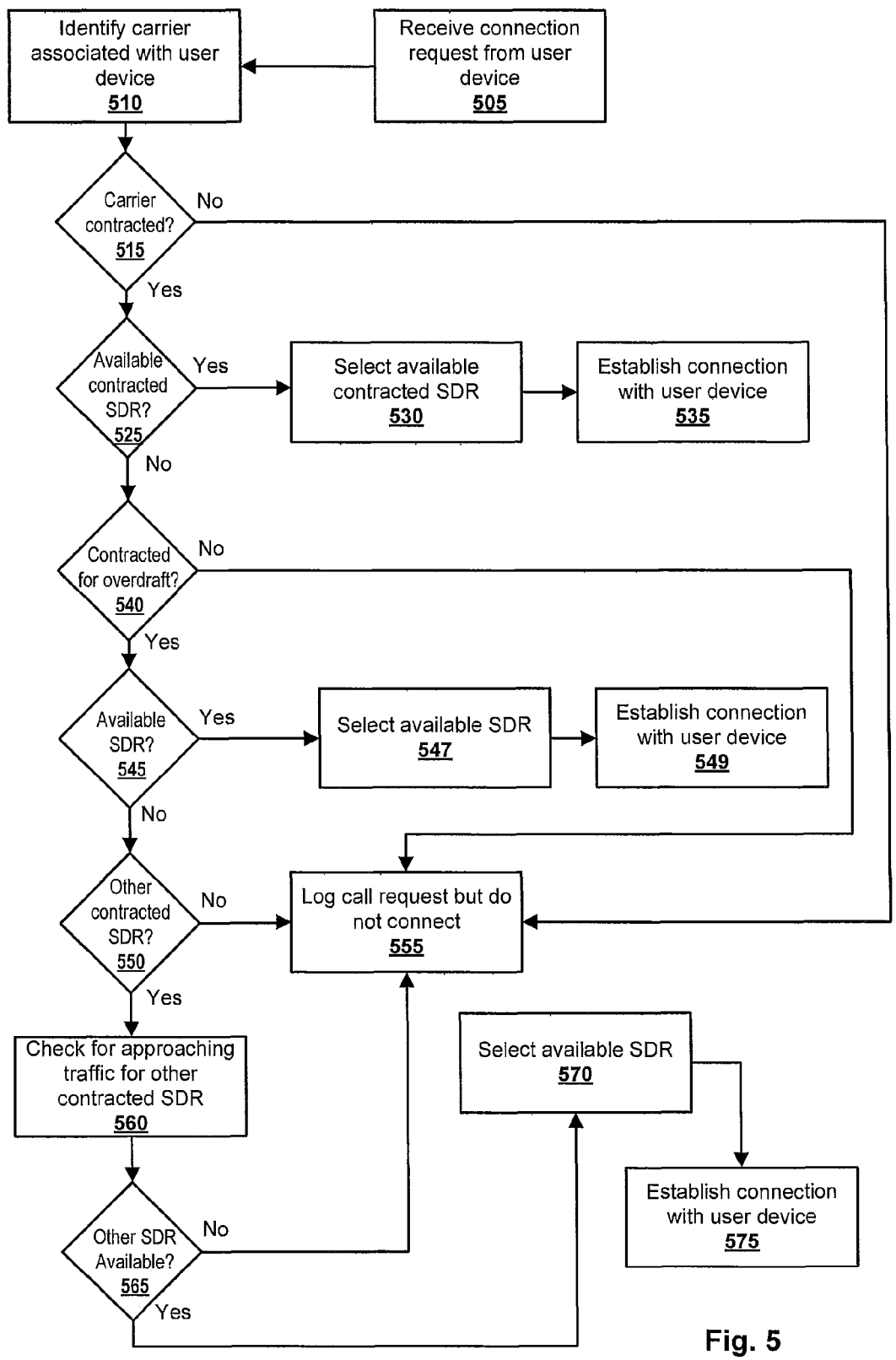
FIG. 5 is a flow diagram of another method for reconfiguring the radio devices of a femtocell to handle peak demands for connectivity according to an embodiment.

FIG. 5 is a flow diagram of another method for reconfiguring the radio devices of a femtocell to handle peak demands for connectivity according to an embodiment. The femtocell 115 can be configured to provide "overdraft" coverage for subscribers of a particular carrier during peak demand periods if there is an available SDR that can be reconfigured to provide connectivity to the user devices associated with the carrier. In the embodiment illustrated in FIG. 5, the femtocell 115 can select an SDR that is contracted to another carrier as long as the SDR is currently unutilized. In some embodiments, the femtocell 115 can be configured to monitor for user devices that may be handed off from adjacent base stations before determining whether to reallocate a carrier's contracted SDR.

The femtocell 115 can detect a connection request from a user device 105 within the coverage area of the femtocell 115 (step 505) and identify the carrier associated with the user device 105 (step 510). The SDR allocation module 237 receives the connection request from the user device 105 on a specific frequency band with an initial exchange of information from the user device 105 to an SDR 210. In turn, the SDR 210 either seeks authentication locally or in a remote context tied to an authentication function associated with a mobile core network 130. The mobile core network 130 responds with either an accept or reject indication. If there is acceptance, it is often tied to a function whereby the user's home network has indicated that there is a preferred list of networks on which the user device 105 has the ability to operate under pre-established business terms. The business terms govern what the home network provider pays the third-party network provider for services provided to the user device 105.

A determination can be made whether the carrier associated with the user device has contracted for coverage with the femtocell provider (step 515). In an embodiment, the SDR allocation module 237 can be configured to keep track of which carriers have subscribed for coverage from the femtocell 115, and at which times if the carriers have not subscribed for full-time coverage. If the SDR allocation module 237 determines that the carrier associated with the user device that is requesting the connection has not contracted for coverage from the femtocell 115, the SDR allocation module 237 can log the call request in an unserviced user device log stored in the memory 230 of the femtocell and the call request can be ignored. The unserviced user device information can later be transmitted to the NOC 190 and/or Reporting Server 195 for reporting and marketing purposes. The provider of the femtocell 115 can market its services to the carrier whose unserviced user device entered the coverage area of the femtocell 115.

If the carrier of the user device has contracted for coverage from the femtocell 115, the SDR allocation module 237 can make a determination whether the carrier has a contracted SDR 210 available that can handle a connection with another user device (step 525). If the SDR allocation module 237 determines that there is at least one available contracted SDR 210 that can handle the connection to the user device 105 from which the connection request was received, the SDR allocation module 237 selects an SDR from the identified SDRs 210 (step 530) and establishes a connection with the user device 105 via the selected SDR 210 (step 535).

Otherwise, if the SDR allocation module 237 determines that there is not at least one available contracted SDR 210 that can handle the connection to the user device 105, the SDR allocation module 237 can make a determination whether the carrier associated with the requesting user device is contracted for overdraft coverage during peak utilization periods (step 540). If the carrier is not contracted for overdraft coverage during peak periods, the SDR allocation module 237 can log the details of the call request but not establish a connection with the user device (step 555). The collected call information can be stored in an overdraft log stored in memory 230. This information can be periodically transmitted to the NOC 190 and/or Reporting Server 195 via the backhaul connection, and the femtocell provider can use this information to market the services of the femtocell 115 to the carrier who exceeded its contracted coverage amounts. The femtocell provider can use this information to encourage the carrier to contract for additional coverage during peak periods or for additional coverage overall.

Otherwise, if the carrier has contracted for overdraft coverage, the SDR allocation module 237 can make a determination whether there are currently any excess uncontracted SDRs that can be configured to handle the excess traffic for the carrier (step 545). If there is an available uncontracted SDR, the SDR allocation module 237 can select an available SDR and configure the SDR to handle excess traffic for the carrier (step 547) and a connection can be established to the user device from the selected SDR (step 549).

Otherwise, if there are not any available excess SDRs, the SDR allocation module 237 can make a determination whether there are any contracted but unutilized SDRs that are contracted by different carrier (step 550). If there are not any available SDRs, the SDR allocation module 237 can log the details of the call request but not establish a connection with the user device (step 555). The information collected can be sent to the NOC 190 and/or Reporting Server 195 across the backhaul connection and the femtocell provider can use this information for marketing purposes to encourage the carrier to contract for more dedicated services.

If there are available SDRs that are contracted to a second carrier but are unutilized, the SDR allocation module 237 can make a determination whether there are any user devices associated with the carriers of the available SDRs that may be handed off to the femtocell 115 (step 560). Those SDRs that may have a handoff from a user device of the second carrier may be eliminated from consideration in case the user device is handed off to the femtocell 115 by the adjacent base station. The SDR allocation module 237 can then make a determination whether any SDRs contracted to the second carrier are available. If no SDRs are available, the SDR allocation module 237 can log the details of the call request but not establish a connection with the user device (step 555). Otherwise, the SDR allocation module 237 can select one of the available SDRs contracted to the second carrier (step 570) and establish a connection with the user device using the selected SDR (step 575). The SDR allocation module 237 can continue to monitor the utilization and can reconfigure the SDR to provide coverage to the second contracted carrier if utilization by user devices associated with the second carrier increases. This approach enables the femtocell 115 to maximize the usage of the available radio devices during peak usage conditions.

Although the various embodiments described herein are described with respect to a femtocell, the systems and methods disclosed herein can also be implemented in other types of base stations, including picocells. Some embodiments can include a mix of different types of base stations.

Furthermore, according to an embodiment, the femtocell 115 backhaul can be implemented using an External Radio Device Support System (ERDSS) module, for example, as described in related U.S. Provisional Patent Application Ser. No. 61/379,678, entitled "Systems and Methods for Controlling Quality of Service at Picocells Using Agnostic Platform," filed on Sep. 2, 2010, and U.S. patent application Ser. No. 13/224,054, also entitled "Systems and Methods for Controlling Quality of Service at Picocells Using Agnostic Platform," filed on Sep. 1, 2011, both of which are incorporated in their entireties as set forth in full herein. In the embodiments of the femtocell 115 that include an ERDSS module, the ERDSS module can replace one or more of the components of femtocell 115 illustrated in FIG. 2, including processor 220.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and therefore are representative of the subject matter, which is broadly contemplated by the present invention. It is further understood that the scope of the present invention fully encompasses other embodiments that may become obvious to those skilled in the art.

What is claimed is:

1. A configurable base station, comprising: a plurality of radio devices, each of which establish a wireless connection between the base station and a plurality of user devices, at least one of the plurality of radio devices configurable to establish the wireless connections using multiple frequencies or protocols; a network interface that sends data to a network and receives data from the network; at least one processor; and at least one executable software module that, when executed by the at least one processor, detects a connection request from a requesting one of the plurality of user devices, identifies a carrier associated with the requesting user device, determines whether the associated carrier has subscribed for coverage from the base station, and when it is determined that the associated carrier has subscribed for coverage from the base station, determines whether there is an available contracted one of the plurality of devices, when it is determined that there is an available contracted one of the plurality of radio devices, establishes a connection between the requesting user device and the available contracted radio device, and when it is determined that there is not an available contracted one of the plurality of radio devices, determines whether the associated carrier has overage coverage, and when it is determined that the associated carrier has overage coverage, reconfigures one of the plurality of radio devices to use a frequency or protocol which is different than it was using prior to reconfiguration and establishes a connection between the requesting user device and the reconfigured radio device.

2. The configurable base station of claim 1, wherein the plurality of radio devices comprise software-defined radio devices.

3. The configurable base station of claim 1, wherein the base station is a femtocell.

4. The configurable base station of claim 1, wherein the at least one executable software module receives a configuration command from a remote network operations center via the network interface and reconfigures one or more of the plurality of radio devices to be assigned to a first carrier in response to the configuration command received from the remote network operations center, the one or more of the plurality of radio devices not being assigned to the first carrier before the reconfiguration.

5. The configurable base station of claim 1, wherein the at least one executable software module reconfigures one or more of the plurality of radio devices to be assigned to a first carrier in response to a change in usage of the base station, the one or more of the plurality of radio devices not being assigned to the first carrier before the reconfiguration.

6. The configurable base station of claim 5, wherein the change in usage of the base station is an increase in usage by user devices associated with the first carrier.

7. The configurable base station of claim 1, wherein the at least one executable software module receives an emergency override command from a remote network operations center via the network interface, and the at least one executable software module, in response to receiving the emergency override command, configures one or more of the plurality of radio devices to operate with one or more frequencies and one or more protocols used by an emergency service.

8. The configurable base station of claim 7, wherein the at least one executable software module, in response to receiving the emergency override command, determines whether the emergency override command comprises an extreme emergency request, and if the emergency override command does comprise an extreme emergency request, configures all of the plurality of radio devices to operate with the one or more frequencies and one or more protocols used by the emergency service.

9. The configurable base station of claim 1, wherein the at least one executable software module, when it is determined that the associated carrier has not subscribed for coverage from the base station, logs the connection request in an unserviced user device log.

10. The configurable base station of claim 1 wherein the at least one executable software module, when it is determined that the associated carrier does not have overage coverage, logs the connection request in an overdraft log.

11. The configurable base station of claim 1, wherein the at least one executable software module: detects whether a handoff of one or more user devices from an adjacent base station to the base station is imminent, wherein the one or more user devices to be handed off are associated with a second carrier; and, when it is detected that a handoff is imminent, reserves at least one of the plurality of radio devices, which is assigned to the second carrier, for usage by the one or more user devices to be handed off.

12. The configurable base station of claim 1, wherein the at least one executable software module keeps track of which carriers have subscribed for coverage from the base station.

13. The configurable base station of claim 4, wherein the at least one executable software module reconfigures the one or more of the plurality of radio devices to be assigned to the first carrier by changing at least a frequency or protocol used by the one or more of the plurality of radio devices.

14. A method of operating a base station, the base station comprising a processor and a plurality of radio devices, the method comprising, by the processor: detecting a connection request from a user device; identifying a carrier associated with the user device; determining whether the associated carrier has subscribed for coverage from the base station; and, when it is determined that the associated carrier has subscribed for coverage from the base station, determining whether there is an available contracted one of the plurality of radio devices, when it is determined that there is an available contracted one of the plurality of radio devices, establishing a connection between the user device and the available contracted radio device, and, when it is determined that there is not an available contracted one of the plurality of radio devices, determining whether the associated carrier has overage coverage, and, when it is determined that the associated carrier has overage coverage, reconfiguring one of the plurality of radio devices to use a frequency or protocol which is different than it was using prior to reconfiguration and establishing a connection between the user device and the reconfigured radio device.

15. The method of claim 14, further comprising:
receiving an emergency override command from a remote network operations center; and
in response to the emergency override command, configuring one or more of the plurality of radio devices to operate with one or more frequencies and one or more protocols used by an emergency service.

16. The method of claim 14, further comprising, when it is determined that the associated carrier has not subscribed for coverage from the base station or when it is determined that the associated carrier does not have overage coverage, storing information related to the connection request in a log.

17. The method of claim 16, further comprising sending the log to a remote reporting server.

18. A wireless base station, comprising: radio devices configured to establish wireless connections between the base station and user devices, the radio devices capable of establishing the wireless connections between the base station and the user devices using multiple frequencies or protocols; a network interface configured to send data to a network and receive data from the network; a processor; and a radio allocation module comprising instructions that, when executed by the processor, cause the base station to identify a carrier associated with a new user device, determine whether the associated carrier has contracted for coverage from the base station, and when it is determined that the associated carrier has contracted for coverage from the base station, determine whether there is an available contracted one of the radio devices, when it is determined that there is an available contracted one of the radio devices, establish a connection between the new user device and the available contracted radio device, and when it is determined that there is not an available contracted one of the radio devices, determine whether the associated carrier has contracted for overdraft coverage from the base station, and when it is determined that the associated carrier has contracted for overdraft coverage from the base station, determine whether there is an available uncontracted one of the radio devices, and when it is determined that there is an available uncontracted one of the radio devices, configure the available uncontracted one of the radio devices to operate using a frequency and protocol suitable for connecting with user devices associated with the associated carrier, and establish a connection between the new user device and the reconfigured available uncontracted one of the radio devices.

19. The wireless base station of claim 18, wherein the radio allocation module further comprises instructions that, when executed by the processor, cause the base station to when it is determined that there is not an available uncontracted one of the radio devices, determine whether there is an unutilized one of the radio devices contracted by a carrier different than the associated carrier, when it is determined that there is an unutilized one of the radio devices contracted by the different carrier, determine whether there is a user device associated with the different carrier that may be handed off to the base station, and when it is determined that there is not a user device associated with the different carrier that may be handed off to the base station, configure the unutilized one of the radio devices to operate using a frequency and protocol suitable for connecting with user devices associated with the associated carrier, and establish a connection between the new user device and the reconfigured unutilized one of the radio devices.

20. The wireless base station of claim 19, wherein the radio allocation module further comprises instructions that, when executed by the processor, cause the base station to when it is determined that the associated carrier has not contracted for coverage from the base station, log the connection request in a log, when it is determined that the associated carrier has not contracted for overdraft coverage from the base station, log the connection request in the log, and when it is determined that there is not an unutilized one of the radio devices contracted by the different carrier, log the connection request in the log.

21. The method of claim 20, wherein the radio allocation module further comprises instructions that, when executed by the processor, cause the base station to send the log to a remote reporting server.

22. The wireless base station of claim 18, further comprising
a sniffer module configured to detect radio frequency signals; and
a sniffer control module comprising instructions that, when executed by the processor, cause the sniffer module to sweep a range of frequencies and identify frequencies on which other base stations or the user devices are transmitting.

23. The wireless base station of claim 22, further comprising
an antenna; and
a radio-frequency front end module comprising circuitry for coupling the antenna to the radio devices and to the sniffer module.

24. The wireless base station of claim 22, wherein the radio allocation module further comprises instructions that, when executed by the processor, cause the base station to use information collected from the sniffer module for load balancing.

* * * * *